US008599105B2

(12) United States Patent
Anttila et al.

(10) Patent No.: US 8,599,105 B2
(45) Date of Patent: Dec. 3, 2013

(54) METHOD AND APPARATUS FOR IMPLEMENTING A MULTIPLE DISPLAY MODE

(75) Inventors: Akseli Anttila, Helsinki (FI); Younghee Jung, Bangalore (IN); Yumiko Tanaka, London (GB)

(73) Assignee: Nokia Corporation, Espoo (FI)

( * ) Notice: Subject to any disclaimer, the term of this patent is extended or adjusted under 35 U.S.C. 154(b) by 699 days.

(21) Appl. No.: 12/829,474

(22) Filed: Jul. 2, 2010

(65) Prior Publication Data
US 2012/0001829 A1   Jan. 5, 2012

(51) Int. Cl.
*G09G 5/00* (2006.01)

(52) U.S. Cl.
USPC .......................................................... 345/1.3

(58) Field of Classification Search
USPC .................................................. 345/1.1, 1.3
See application file for complete search history.

(56) References Cited

U.S. PATENT DOCUMENTS

| 7,123,945 | B2 | 10/2006 | Kokubo | |
|---|---|---|---|---|
| 7,269,797 | B1 | 9/2007 | Bertocci et al. | |
| 7,310,540 | B2 | 12/2007 | Meins et al. | |
| 2002/0183099 | A1* | 12/2002 | Lee ............................. | 455/566 |
| 2003/0006942 | A1 | 1/2003 | Searls et al. | |
| 2004/0061662 | A1* | 4/2004 | Yoshihara et al. ............. | 345/1.1 |
| 2005/0083642 | A1 | 4/2005 | Senpuku et al. | |
| 2006/0005131 | A1 | 1/2006 | Tao | |
| 2006/0030369 | A1* | 2/2006 | Yang ........................... | 455/566 |
| 2007/0013608 | A1* | 1/2007 | Goo et al. ..................... | 345/1.1 |
| 2007/0164923 | A1* | 7/2007 | Kanai et al. ................... | 345/1.1 |
| 2008/0207273 | A1 | 8/2008 | Huo | |
| 2008/0268901 | A1 | 10/2008 | Miramontes | |
| 2009/0106849 | A1* | 4/2009 | Wu ................................. | 726/28 |
| 2009/0322690 | A1* | 12/2009 | Hiltunen et al. ............. | 345/173 |
| 2010/0007576 | A1* | 1/2010 | Demuynck et al. ........... | 345/1.3 |
| 2010/0039350 | A1* | 2/2010 | Wakefield et al. ............ | 345/1.3 |
| 2010/0060587 | A1* | 3/2010 | Freund ......................... | 345/169 |
| 2011/0069043 | A1* | 3/2011 | Lee et al. ..................... | 345/204 |
| 2011/0074655 | A1* | 3/2011 | Tan et al. ...................... | 345/1.1 |
| 2012/0005602 | A1* | 1/2012 | Anttila et al. ................ | 715/761 |
| 2012/0101722 | A1* | 4/2012 | Inami et al. .................. | 701/428 |

FOREIGN PATENT DOCUMENTS

| CN | 2009 83603 | 11/2007 |
|---|---|---|
| CN | 2010 18540 | 2/2008 |
| CN | 1012 22530 | 7/2008 |
| CN | 2011 18663 | 9/2008 |

(Continued)

OTHER PUBLICATIONS

International Search Report and Written Opinion for Application No. PCT/FI2011/050531 dated Oct. 11, 2011.

(Continued)

*Primary Examiner* — Tom Sheng
(74) *Attorney, Agent, or Firm* — Alston & Bird LLP

(57) ABSTRACT

Various methods for implementing a multiple display mode are provided. One example method includes receiving an indication of a transition to a multiple display mode, and in response to at least receiving the indication of the transition to the multiple display mode, causing a home screen with home screen content to be displayed by a first display of a device. The example method may further include, in response to at least receiving the indication of the transition to the multiple display mode, causing application content provided by an application being implemented to be displayed by a second display of the device while the home screen with the home screen content is being displayed by the first display. Similar and related example methods and example apparatuses are also provided.

22 Claims, 7 Drawing Sheets

(56) References Cited

FOREIGN PATENT DOCUMENTS

| | | |
|---|---|---|
| CN | 2011 30969 | 10/2008 |
| CN | 2012 86119 | 8/2009 |
| EP | 0 898 223 A2 | 2/1999 |
| EP | 1 635 550 B1 | 3/2006 |
| EP | 1 655 657 A1 | 5/2006 |
| EP | 1 713 264 A2 | 10/2006 |
| EP | 1 770 968 A2 | 4/2007 |
| EP | 1 802 085 A1 | 6/2007 |
| EP | 1 970 799 A2 | 9/2008 |
| EP | 2 020 807 A1 | 2/2009 |
| EP | 2 071 445 A1 | 6/2009 |
| EP | 2 120 426 A1 | 11/2009 |
| EP | 2 254 313 A1 | 11/2010 |
| JP | 2006-323850 A | 11/2006 |
| KR | 1020040107051 | 12/2004 |
| KR | 1020060057053 | 5/2006 |
| KR | 2006 0132196 | 12/2006 |
| WO | WO 2005/050393 A2 | 6/2005 |
| WO | WO 2007/051126 A1 | 5/2007 |
| WO | WO 2008/077063 A2 | 6/2008 |
| WO | WO 2009/104185 A2 | 8/2009 |
| WO | WO 2009/113588 A1 | 9/2009 |
| WO | WO 2010/028405 A1 | 3/2010 |

OTHER PUBLICATIONS

*3 Efficiency Tip for Using Dual Monitors* [online] [retrieved Apr. 23, 2010]. Retrieved from the Internet: <URL: http://webworkerdaily.com/2009/06/02/3-efficiency-tips-for-using-dual-monitors/>. 17 pages.

\* cited by examiner

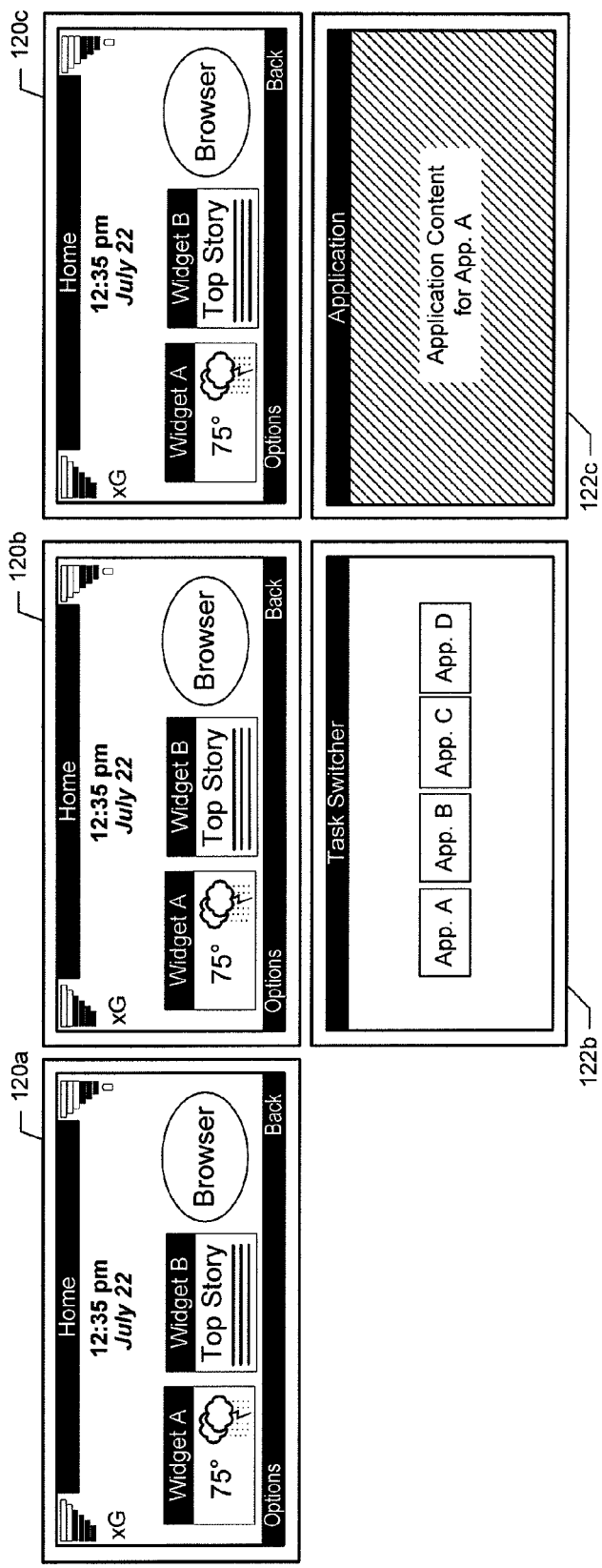

METHOD AND APPARATUS FOR IMPLEMENTING A MULTIPLE DISPLAY MODE

TECHNICAL FIELD

Embodiments of the present invention relate generally to implementing a user interface, and, more particularly, relate to a method and apparatus for implementing a multiple display mode.

BACKGROUND

As mobile computing and communications devices become increasingly flexible and convenient, users of the devices have become increasingly reliant on the functionality offered by the devices in both social and business settings. Due to advances made in the data storage capabilities, the communications capabilities, and the processing power of mobile devices, the functionality offered by the devices continues to evolve. As new functionalities are introduced or become popular, the user demand for convenient and intuitive user interface techniques also increases. To meet the demands of the users or encourage utilization of new functionality, innovation in the design and operation of user interfaces must keep pace.

SUMMARY

Example methods and example apparatuses are described herein that provide for implementing a multiple display mode user interface. One example method includes receiving an indication of a transition to a multiple display mode, and in response to at least receiving the indication of the transition to the multiple display mode, causing a home screen with home screen content to be displayed by a first display of a device. The example method may further include, in response to at least receiving the indication of the transition to the multiple display mode, causing application content provided by an application being implemented to be displayed by a second display of the device while the home screen with the home screen content is being displayed by the first display.

An additional example embodiment is an apparatus configured to implement a multiple display mode. The example apparatus comprises at least one processor and at least one memory including computer program code, the at least one memory and the computer program code configured to, with the at least one processor, direct the apparatus to perform various functionality. In this regard, the example apparatus may be caused to receive an indication of a transition to a multiple display mode, and, in response to at least receiving the indication of the transition to the multiple display mode, cause a home screen with home screen content to be displayed by a first display of a device. The example apparatus may be further directed to, in response to at least receiving the indication of the transition to the multiple display mode, cause application content provided by an application being implemented to be displayed by a second display of the device while the home screen with the home screen content is being displayed by the first display.

Another example embodiment is a computer program product comprising a memory having computer program code stored thereon, wherein the computer program code is formulated to direct an apparatus to perform various functionalities. In this regard, the program code may be formulated to receive an indication of a transition to a multiple display mode, and, in response to at least receiving the indication of the transition to the multiple display mode, cause a home screen with home screen content to be displayed by a first display of a device. The program code may also be formulated to direct the apparatus to, in response to at least receiving the indication of the transition to the multiple display mode, cause application content provided by an application being implemented to be displayed by a second display of the device while the home screen with the home screen content is being displayed by the first display.

Another example apparatus includes means for receiving an indication of a transition to a multiple display mode, and means for causing a home screen with home screen content to be displayed by a first display of a device, in response to at least receiving the indication of the transition to the multiple display mode. The example apparatus may further include means for causing application content provided by an application being implemented to be displayed by a second display of the device while the home screen with the home screen content is being displayed by the first display, in response to at least receiving the indication of the transition to the multiple display mode.

BRIEF DESCRIPTION OF THE DRAWING(S)

Having thus described example embodiments of the invention in general terms, reference will now be made to the accompanying drawings, which are not necessarily drawn to scale, and wherein:

FIGS. 3a through 3c illustrate a sequence of example screen shots of displays participating in the implementation of a multiple display mode according to an example embodiment of the present invention;

DETAILED DESCRIPTION

Figure 1:
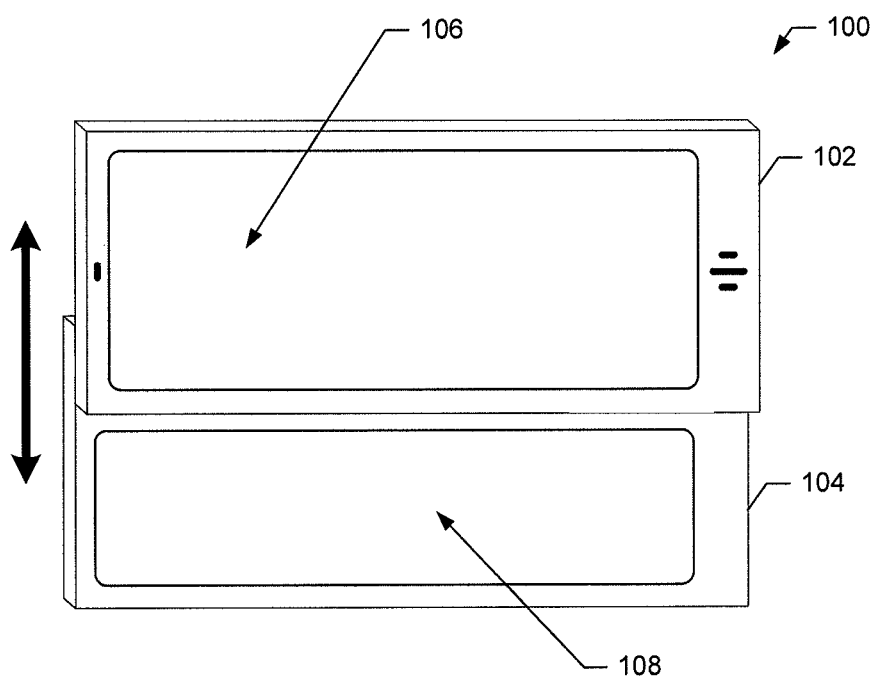
FIG. 1 illustrates an example mobile terminal with multiple displays constructed in a slide form factor according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

According to various example embodiments of the present invention, a multiple display mode may be implemented that involves displaying a home screen on one of at least two displays of a device, while other content is being displayed on another display. A home screen may be a virtual surface that spans one or more screen areas and houses home screen content. Home screen content may include shortcuts, widgets, home screen wallpaper, device status information, and the like. Home screen content may be positioned by the user within the home screen to allow the user to, for example, place content that the user most frequently interacts with in a convenient location on the home screen.

A shortcut may be a link to an application or other content, and may be associated with a displayed icon. In some example embodiments, an icon for an application may be selectable by a user to initiate the implementation of an application. For example, a web browser shortcut may be included on a home screen, and upon selection of the associated icon by the user, a browser application may be implemented and access the Internet.

A widget may be a home screen content item that is configured to display dynamic information to a user from the home screen. For example, a weather widget may be a program that determines the current location of the device (e.g., via the global positioning system (GPS), cell tower triangulation, or the like), retrieves current weather data for the determined location from the Internet, and outputs a representation of the weather information as a content item on the home screen. A widget, such as for example, the weather widget, may cause dynamically changing data or information to be displayed, which is visible to the user while on the home screen. Another example of a widget may be a news widget. A news widget may be a home screen content item that provides, for example, the headlines of recent or current news stories. The displayed representation of the news widget or the headlines provided by the news widget may be selectable by a user to, for example, open a web page that includes a full article associated with the headline. A user may therefore monitor the news widget from the home screen, and when a headline is provided that is of interest to the user, the user may select the headline to read more. Yet another example of a widget may be an online social networking widget. A social networking widget may relay status updates of the user's online social network friends for display on the home screen. In this regard, a user's friend may update their online social networking status to indicate that they are enjoying an afternoon at the park. The online social networking widget may retrieve this information and display it to the user within the online social networking widget on the home screen.

Home screen wallpaper may be an image that is displayed under or behind the content items included on the home screen. In some example embodiments, the home screen wallpaper may be a static image such as, for example, a digital photograph. However, in some example embodiments, the home screen wallpaper may be dynamic. In this regard, for example, the home screen wallpaper may be implemented as a slide show of image files taken from a digital image library stored on the device. Alternatively, the home screen wallpaper may be an image of a roadmap centered at the current location of the device.

The home screen may also include device status information. In this regard, the device status information may include the current time and date, an indication of a wireless signal strength, a battery life indicator, an event alert indicator (e.g., email alert, short message service (SMS) alert, voicemail alert, etc.), or the like.

Based on the foregoing, the home screen can display both static and dynamic information to a user. In some situations, a user may wish to have quick access to home screen content or visually monitor dynamic home screen content, even while the user is, for example, implementing an application on the same device. In this regard, a device, such as, for example, a mobile terminal may leverage the inclusion of a first and a second display to implement a multiple display mode where the home screen can be displayed on a first display, while the user interacts with a currently implemented application on a second display.

Figure 2:
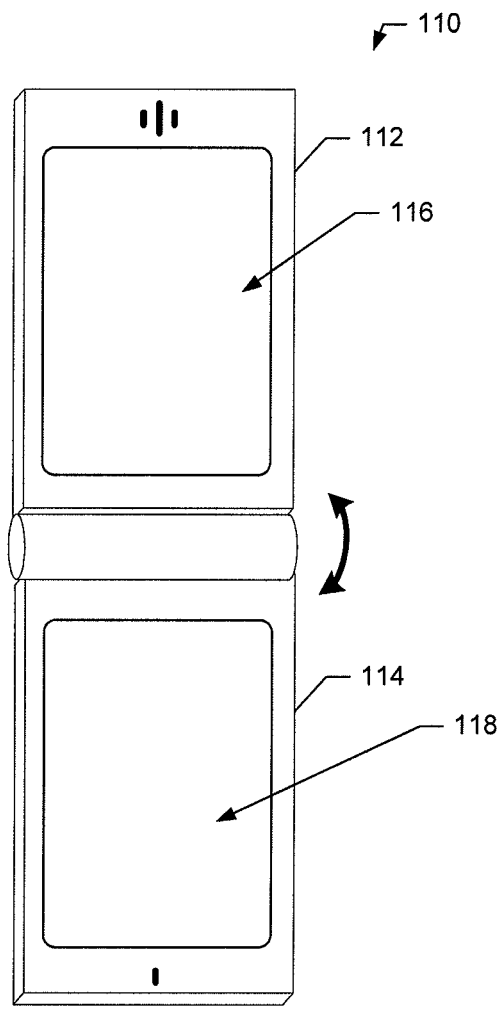
FIG. 2 illustrates an example mobile terminal with multiple displays constructed in a fold form factor according to an example embodiment of the present invention.

FIGS. 1 and 2 illustrate example mobile terminal devices 100 and 110 that may be configured to support a single display mode and a multiple display mode depending, for example, on the positioning of the movable portions of mobile terminals as described herein. In some example embodiments, such as, for example, those that are implemented on a mobile terminal that includes no moveable portions, a mobile terminal may be placed in or transitioned between a single display mode or a multiple display mode via, for example, user input. According to various example embodiments, a processor or other circuitry of a mobile terminal may receive an indication of a transition between a single display mode and a multiple display mode via electrical contacts or switches that are actuated when movable portions of the mobile terminals place the mobile terminal in particular physical configurations. In some example embodiments, user input via a user interface may be received by the processor or other circuitry as an indication of the transition between a single display mode and a multiple display mode.

According to various example embodiments, a device may be in a single display mode or a multiple display mode. While a device may include two or more displays, in a single display mode, one of the displays may be active. The active display may be displaying, for example, the home screen and home screen content, application content, or the like. In a multiple display mode, according to various example embodiments, two or more displays are active, and at least one of the displays may be displaying the home screen and the home screen content.

FIG. 1 displays a slide form factor mobile terminal 100. For a slide form factor mobile terminal 100, a first housing portion 102 including a first display 106 may be moved or slid to a position above a second display 108 that is housed in a second housing portion 104, or slid to a position that is in front of the second display 108. In some example embodiments, the first and second housing portions may remain in physical connection with each other before, during, and after the movement, due to one or more grooves or tracks that facilitate movably holding the portions in physical connection. The terminal 100 may be positioned into at least two physical configurations. In a first physical configuration, the first housing portion 102 is slid down, and in front of, the second housing portion 104 to conceal the second display 108. Via electrical contacts or switches, when the mobile terminal 100 transitions into this first physical configuration, an indication may be received by a processor or other circuitry signifying that the mobile terminal has transitioned into a single display mode. The first display 106 may be active in this first physical configuration of the mobile terminal 100.

When the first housing portion 102 is slid upward (or the second housing portion is slid downward) such that the second display 108 is revealed and positioned below the first display 106, the mobile terminal 100 may be in a second physical configuration. Via electrical contacts or switches, when the mobile terminal 100 transitions into this second physical configuration, an indication may be received by a processor or other circuitry signifying that the mobile terminal has transitioned into a multiple display mode. The first display 106 and the second display 108 may be active in this second physical configuration of the mobile terminal 100.

FIG. 2 displays a fold form factor mobile terminal 110. For a fold form factor mobile terminal 110, a first housing portion 112 including a first display 116 may be movable via a hinge relative to a second housing portion 114 including a second display 118. In this regard, the mobile terminal 110 may be positioned into at least an open physical configuration or a closed physical configuration. In the open physical configuration, the first housing portion 112 and the first display 116 may be positioned above the second housing portion 114 and the second display 118 such that both the first and second displays are viewable by a user on a common face of the mobile terminal 110. Via electrical contacts or switches, when the mobile terminal 110 transitions into this open physical configuration, an indication may be received by a processor or other circuitry signifying that the mobile terminal has transitioned into a multiple display mode. The first display 116 and the second display 118 may be active in this open physical configuration of the mobile terminal 110.

According to various example embodiments, the mobile terminal 110 may also be configured into a closed physical configuration. In some example embodiments, when the first housing portion is rotated downward into a closed physical configuration, the first and second displays may be accessible on front and back faces of the mobile terminal. Via electrical contacts or switches, when the mobile terminal 110 transitions into this closed physical configuration, an indication may be received by a processor or other circuitry signifying that the mobile terminal has transitioned into a single display mode. The first display 116, the second display 118, or both displays may be active in this closed physical configuration of the mobile terminal 110.

Alternatively, in some example embodiments, the first housing portion 112 may include a third display (not depicted) on a back face of the first housing portion 112. In this regard, when the first housing portion is rotated downward into a closed configuration, the first and second displays may be concealed and the third display may be accessible to the user. Via electrical contacts or switches, when the mobile terminal 110 transitions into this closed physical configuration, an indication may be received by a processor or other circuitry signifying that the mobile terminal has transitioned into a single display mode. The third display may be active in this closed physical configuration of the mobile terminal 110.

Alternatively, in some example embodiments, the second housing portion 114 may be constructed to swivel at least 180 degrees about a central vertical axis. When the second housing portion 114 is swiveled and the first housing portion is rotated downward into a closed physical configuration, the first display 116 may be accessible on the front face of the mobile terminal and the second display 118 may be concealed. Via electrical contacts or switches, when the mobile terminal 110 transitions into this closed physical configuration, an indication may be received by a processor or other circuitry signifying that the mobile terminal has transitioned into a single display mode. The first display 116 may be active in this closed physical configuration of the mobile terminal 110.

FIGS. 1 and 2 provide example embodiments of mobile terminals that can be physically configured to support either a single display mode or a multiple display mode. It is noteworthy that other mobile terminal constructions with or without moveable portions are also contemplated that similarly support physical configurations that may be associated with a single display mode or a multiple display mode. Additionally, in accordance with various example embodiments, if a device's user interface is in a locked state to avoid unintended user input (e.g., due to unintended physical interaction with a touch screen display), upon receiving an indication that the device has transitioned from a single display mode to a multiple display mode, the device's user interface (e.g., both of the device's touch screen displays) may be transitioned to an unlocked state.

FIGS. 3a-3c and 4a-4b illustrate the example scenarios for displaying a home screen after a device transitions from a single display mode to a multiple display mode. FIG. 3a illustrates the presented content of a first display 120a, when a device is in a single display mode and is displaying a home screen. The home screen of FIGS. 3a-3c and FIG. 4b are displaying home screen content include a weather widget (Widget A), a news widget (Widget B), an icon for a shortcut (indicated as "Browser"), and device status information as described above.

Due to, for example, a change in the physical configuration of a device and receipt of an indication of a transition to a multiple display mode, a second display 122b of the device may be activated as illustrated in FIG. 3b. In this regard, in response to receiving an indication of the transition to the multiple display mode from the single display mode, the home screen may continue to be displayed on the first display 120b (e.g., on the upper display). Since, for example, an application was not being implemented in the foreground in FIG. 3a, a task switcher (or history of content screen) may be displayed by the second display 122b. The task switcher may be configured to allow a user to select one of the applications (e.g., App. A, App. B, App. C, or App. D) that is currently running in the background or applications that have been recently implemented. As indicated in FIG. 3c, the user has selected App. A and, in response to at least the selection of App. A and receipt of the indication of the transition to the multiple display mode, the application content for App. A may be displayed by the second display 122c, while the home screen continues to be displayed by the first display 120c. Furthermore, the user is able to select one of the shortcuts on the home screen 120c and the application content of the second display 122c will be replaced by the application launched by the shortcut.

As such, referring to FIG. 3c, according to various example embodiments, a user is enabled to interact with an application that is currently being implemented and displayed in the second display 122c, while also displaying the home screen in the first display 120c. The user, according to various example embodiments, can therefore interact with content on the home screen while also interacting with application content, or monitor data that is dynamically changing on the home screen (e.g., data provided by the widgets), while also interacting with application content. Further, according to various example embodiments, in the multiple display mode, the user interface for the home screen can be dedicated to one display as a first mono-user interface, and the application content can be dedicated to another display as a second, and separate, mono-user interface. According to various example embodiments, including those described with respect to FIGS. 4a and 4b, a device may also be configured to present alerts and notifications on the display presenting the home screen, so as not to impact or otherwise interrupt the user's interaction with the application content presented by the other display.

Figure 4B:
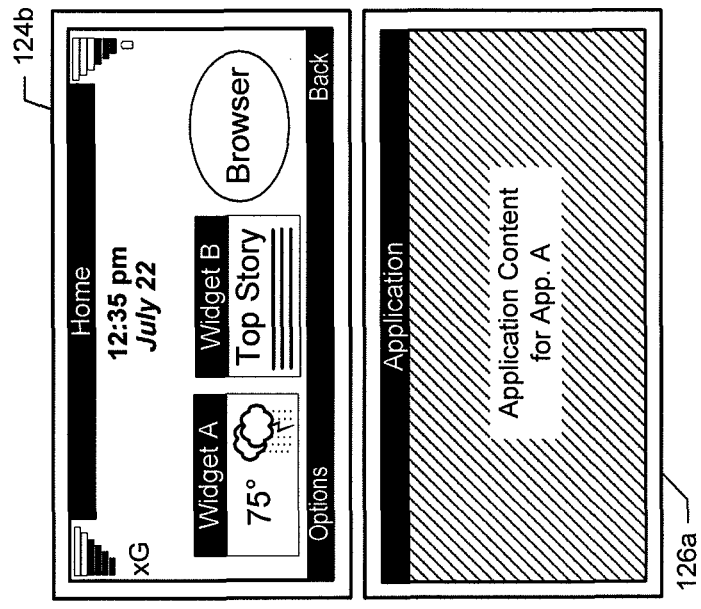
FIGS. 4a and 4b illustrate a sequence of example screen shots of displays participating in the implementation of a multiple display mode according to another example embodiment of the present invention.
Figure 4A:
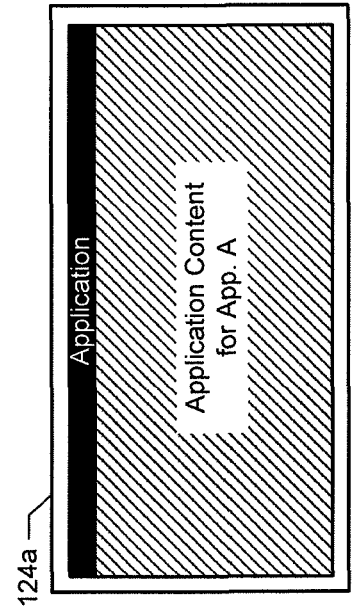

FIGS. 4a and 4b illustrate an example scenario where an application is running in the foreground when an indication of a transition to multiple display mode is received. In this regard, FIG. 4a illustrates a situation where a device is currently in a single display mode, and a first display 124a is providing application content. In response to at least receiving an indication of a transition to a multiple display mode, the application content may be transferred to a second display 126a and a home screen may be displayed in the first display 124b. The display of the home screen in the scenario of FIGS. 4a and 4b, again, according to various example embodiments, provides the user with the ability to interact with application content while also interacting with or monitoring the home screen and the home screen content.

Figure 5:
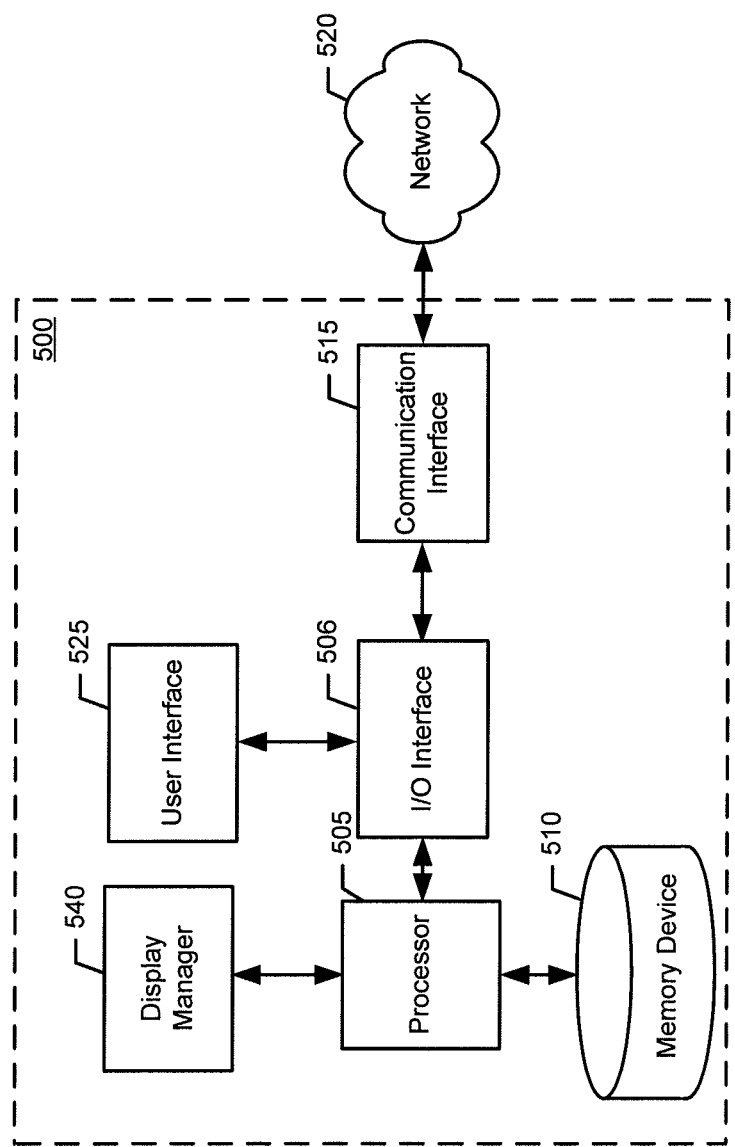
FIG. 5 illustrates a block diagram of an apparatus and associated system for implementing a multiple display mode according to an example embodiment of the present invention.
Figure 6:
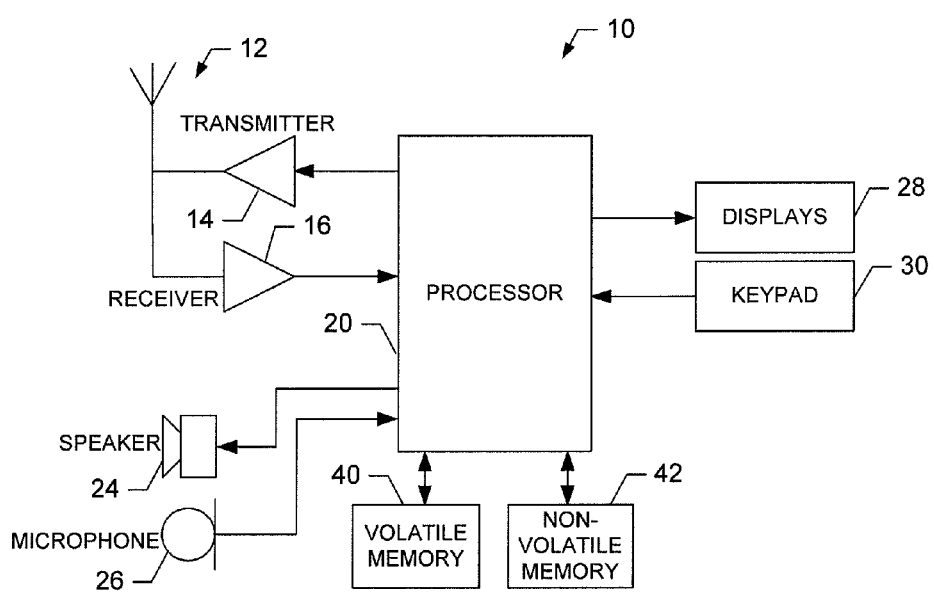
FIG. 6 illustrates a block diagram of a mobile terminal configured for implementing a multiple display mode according to an example embodiment of the present invention.

The description provided above and generally herein illustrates example methods, example apparatuses, and example computer program products for implementing a multiple display mode. FIGS. 5 and 6 depict example apparatuses that are configured to perform various functionalities as described herein, including those described with respect to operations of the flowchart of FIG. 6, and the operation otherwise described herein.

Referring now to FIG. 5, an example embodiment of the present invention is depicted as apparatus 500. Apparatus 500 may, be embodied as, or included as a component of, a communications device with wired and/or wireless communications capabilities. In some example embodiments, the apparatus 500 may be part of a communications device, such as a stationary or a mobile communications terminal. As a mobile device, the apparatus 500 may be a mobile and/or wireless communications node such as, for example, a mobile and/or wireless server, computer, access point, communications switching device, handheld wireless device (e.g., telephone, portable digital assistant (PDA), mobile television, gaming device, camera, video recorder, audio/video player, radio, digital book reader, and/or a global positioning system (GPS) device), any combination of the aforementioned, or the like. Regardless of the type of communications device, apparatus 500 may also include computing capabilities.

FIG. 5 illustrates a functional block diagram of example components of the apparatus 500. With regard to the form factor of apparatus 500, the apparatus, in some example embodiments, may be configured to take the form of mobile computing device having two or more displays. In some example embodiments, the apparatus 500 may take the form of the mobile terminal 100 of FIG. 1, the mobile terminal 110 of FIG. 2, or the like.

The example apparatus 500 includes or is otherwise in communication with a processor 505, a memory device 510, an Input/Output (I/O) interface 506, a communications interface 515, and a display manager 540. The processor 505 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 is configured to execute instructions stored in the memory device 510 or instructions otherwise accessible to the processor 505. The processor 505 may be configured to operate such that the processor causes the apparatus 500 to perform various functionalities described herein.

Whether configured as hardware or via instructions stored on a computer-readable storage medium, or by a combination thereof, the processor 505 may be an entity capable of performing operations according to embodiments of the present invention while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., a communications server or mobile terminal) configured for employing example embodiments of the present invention by further configuration of the processor 505 via executed instructions for performing the algorithms, methods, and operations described herein.

The memory device 510 may be one or more tangible and/or non-transitory computer-readable storage media that may include volatile and/or non-volatile memory. In some example embodiments, the memory device 510 includes Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 510 may include a cache area for temporary storage of data. In this regard, some or all of memory device 510 may be included within the processor 505. In some example embodiments, the memory device 510 may store a image matching database that can be used for image comparisons to determine image matching distances, matching results, and the like.

Further, the memory device 510 may be configured to store information, data, applications, computer-readable program code instructions, and/or the like for enabling the processor 505 and the example apparatus 500 to carry out various functions in accordance with example embodiments of the present invention described herein. For example, the memory device 510 could be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities of the present invention.

The communication interface 515 may be any device or means embodied in hardware, a computer program product, or a combination of hardware and a computer program product that is configured to receive and/or transmit data from/to a network 520 and/or any other device or module in communication with the example apparatus 500. The communications interface may be configured to communicate information via any type of wired or wireless connection, and via any type of communications protocol, such as a communications protocol that supports cellular communications. According to various example embodiments, the communication interface 515 is configured to support the transmission and reception of communications in cellular networks. In this regard, the communications interface 515 may be configured to support device-to-device communications. Processor 505 may also be configured to facilitate communications via the communications interface 515 by, for example, controlling hardware included within the communications interface 515. In this regard, the communication interface 515 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The user interface 525 may be in communication with the processor 505 to receive user input via the user interface 525 and/or to present output to a user as, for example, audible, visual, mechanical or other output indications. The user interface 525 may include, for example, a keyboard, a mouse, a joystick, a display (e.g., a touch screen display), a microphone, a speaker, or other input/output mechanisms. Further, the processor 505 may comprise, or be in communication with, user interface circuitry configured to control at least some functions of one or more elements of the user interface. The processor 505 and/or user interface circuitry may be configured to control one or more functions of one or more elements of the user interface through computer program instructions (e.g., software and/or firmware) stored on a memory accessible to the processor 505 (e.g., volatile memory, non-volatile memory, and/or the like). The user interface 525 may also be configured to support the implementation of haptic feedback. In this regard, the user interface 525, as controlled by processor 205, may include a vibra, a piezo, and/or an audio device configured for haptic feedback as described herein. In some example embodiments, the user interface circuitry is configured to facilitate user control of at least some functions of the apparatus 500 through the use of a display and configured to respond to user inputs. The processor 505 may also comprise, or be in communication with, display circuitry configured to display at least a portion of a user interface, the display and the display circuitry configured to facilitate user control of at least some functions of the apparatus 500.

The user interface 525 may also include a plurality of displays, such as touch screen displays. Each touch screen display may be configured to visually present graphical information to a user. The touch screen displays, which may be embodied as any known touch screen display, may also include a touch detection surface configured to enable touch recognition by any suitable technique, such as resistive, capacitive, infrared, strain gauge, surface wave, optical imaging, dispersive signal technology, acoustic pulse recognition, or other like techniques. The touch screen displays may include all of the hardware necessary to detect a touch when contact is made with the touch detection surface. A touch event may occur when an object, such as a stylus, finger, pen, pencil or any other pointing device, comes into contact with a portion of the touch detection surface of the touch screen display in a manner sufficient to register as a touch. The touch screen displays may also be configured to generate touch event location data indicating the location of the touch event on the screen.

The display manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the display manager 540 as described herein. In an example embodiment, the processor 505 includes, or controls, the display manager 540. The display manager 540 may be, partially or wholly, embodied as processors similar to, but separate from processor 505. In this regard, the display manager 540 may be in communication with the processor 505. In various example embodiments, the display manager 540 may, partially or wholly, reside on differing apparatuses such that some or all of the functionality of the display manager 540 may be performed by a first apparatus, and the remainder of the functionality of the display manager 540 may be performed by one or more other apparatuses.

Further, the apparatus 500 and the processor 505 may be configured to perform the following functionality via display manager 540. In this regard, the display manager 540 may be configured to cause or direct the processor 505 and/or the apparatus 500 to perform various functionalities, such as those described with respect to FIGS. 1-4*b* and FIG. 7 and as generally described herein.

Figure 7:
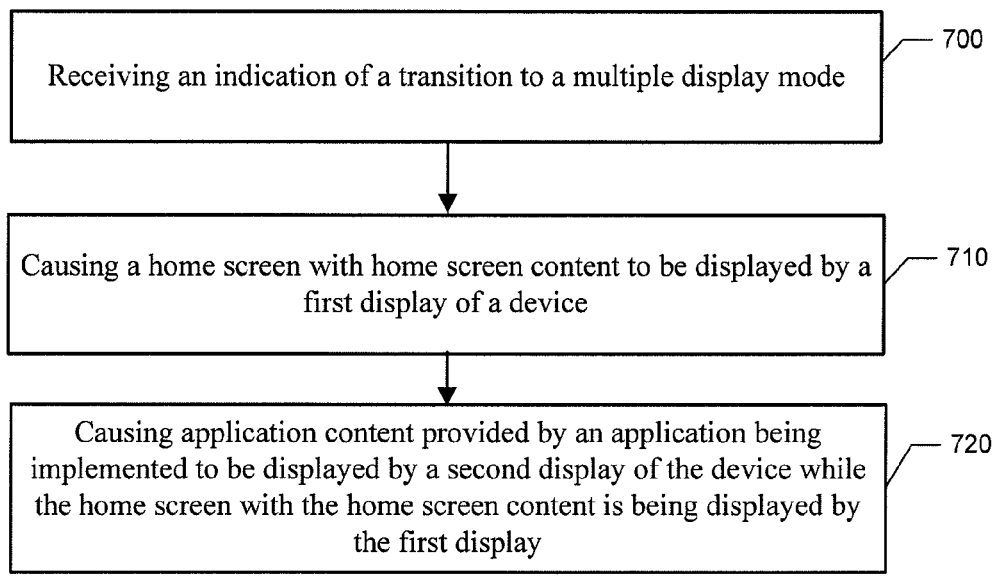
FIG. 7 is a flowchart of an example method for implementing a multiple display mode according to an example embodiment of the present invention.

For example, with reference to FIG. 7, the display manager 540 may be configured to receive an indication of a transition to a multiple display mode at 700. Further, at 710, the display manager may be configured to cause a home screen with home screen content to be displayed by a first display of the apparatus 500. The home screen with the home screen content may be displayed in response to at least receiving the indication of the transition to the multiple display mode. At 720, the display manager 540 may be configured to cause application content provided by an application being implemented to be displayed by a second display of the device while the home screen with the home screen content is being displayed by the first display. The application content may also be displayed in response to at least receiving the indication of the transition to the multiple display mode.

According to some example embodiments, the indication of a transition to a multiple display mode may be received in response to at least a physical movement of the first display of the apparatus 500 relative to the second display of apparatus 500 into a position for the multiple display mode (e.g., see FIG. 1 or FIG. 2). In some example embodiments, the physical movement may include a sliding of the first display to a position above the second display as depicted in FIG. 1. Additionally, or alternatively, the display manager 540 may be configured to cause the application content provided by the application being implemented to be displayed by an active display of a single display mode, prior to receiving the indication of the transition to the multiple display mode. In this regard, the active display of the single display mode may be one of the first display, the second display, or possibly a third display of the apparatus 500. Further, in some example embodiments, the home screen content to be displayed may include a user-positioned icon that is selectable for initiating an associated application and/or a widget that indicates dynamically changing data (e.g., weather information, news information, friends' status updates, or the like). Additionally, or alternatively, the display manager 540 may be configured to cause, in response to at least receiving a selection to activate a second application via user interaction with home screen content, second application content to be displayed by the second display of the device while the home screen with the home screen content is being displayed by the first display.

Referring now to FIG. 6, a more specific example apparatus in accordance with various embodiments of the present invention is provided. The example apparatus of FIG. 6 is a mobile terminal 10 configured to communicate within a wireless network, such as a cellular communications network. The mobile terminal 10 may be configured to perform the functionality of the mobile terminals 100, 110, or apparatus 500 as described herein. More specifically, the mobile terminal 10 may be caused to perform the functionality described with respect to FIGS. 1-4b and FIG. 7 via the processor 20. Processor 20 may be an integrated circuit or chip configured similar to the processor 505 together with, for example, the I/O interface 506. Further, volatile memory 40 and non-volatile memory 42 may be configured to support the operation of the processor 20 as computer readable storage media.

The mobile terminal 10 may also include an antenna 12, a transmitter 14, and a receiver 16, which may be included as parts of a communications interface of the mobile terminal 10. The speaker 24, the microphone 26, displays 28 (which may be touch screen displays), and the keypad 30 may be included as parts of a user interface.

FIG. 7 illustrates flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIG. 7 and otherwise described herein may be stored on a memory device, such as memory device 510, volatile memory 40, or volatile memory 42, of an example apparatus, such as example apparatus 500 or mobile terminal 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
causing application content to be displayed on a first display of a device;
receiving an indication of a transition to a multiple display mode;
in response to at least receiving the indication of the transition to the multiple display mode, causing a home screen with home screen content to be displayed by the first display; and
in response to at least receiving the indication of the transition to the multiple display mode, causing the application content to transition to being displayed on a second display of the device while the home screen with the home screen content is being displayed by the first display.

2. The method of claim 1, further comprising:
prior to receiving the indication of the transition to the multiple display mode, causing the application content provided by the application being implemented to be displayed by an active display of the single display mode, the active display of a single display mode being one of the first display, the second display, or a third display.

3. The method of claim 1, wherein causing the home screen with the home screen content to be displayed includes causing the home screen with the home screen content to be displayed, the home screen content including a user-positioned icon that is selectable for initiating an associated application.

4. The method of claim 1, wherein causing the home screen with the home screen content to be displayed includes causing the home screen with the home screen content to be displayed, the home screen content including a widget that indicates dynamically changing data.

5. The method of claim 1, wherein receiving the indication of the transition to the multiple display mode includes receiving the indication of the transition to the multiple display mode, the indication being received in response to at least a physical movement of the first display relative to the second display into a position for the multiple display mode.

6. The method of claim 1, wherein receiving the indication of the transition to the multiple display mode includes receiving the indication of the transition to the multiple display mode, the indication being received in response to at least a physical movement of the first display relative to the second display into a position for the multiple display mode, the physical movement including a sliding of the first display to a position above the second display.

7. The method of claim 1 further comprising in response to at least receiving a selection to activate a second application via user interaction with home screen content, causing second application content to be displayed by the second display of the device while the home screen with the home screen content is being displayed by the first display.

8. The method of claim 1, further comprising:
receiving an indication of an alert; and
causing display of the alert as a part of the home screen content so as not to impact interaction between a user and the application.

9. The method of claim 1, further comprising:
receiving an indication of a selection of an additional application represented in the home screen content; and
causing the first display to display content associated with the additional application.

10. An apparatus comprising at least one processor and at least one memory including computer program code, the at least one memory and the computer program code configured to, with the at least one processor, direct the apparatus at least to:
cause application content to be displayed on a first display of a device;
receive an indication of the transition to a multiple display mode;
in response to at least receiving the indication of the transition to the multiple display mode, cause a home screen with home screen content to be displayed by the first display and
in response to at least receiving the indication of the transition to the multiple display mode, cause the application content to transition to being displayed on a second display of the device while the home screen with the home screen content is being displayed by the first display.

11. The apparatus of claim 10, wherein the apparatus is further directed to, prior to receiving the indication of the transition to the multiple display mode, cause the application content provided by the application being implemented to be displayed by an active display of a single display mode, the active display of the single display mode being one of the first display, the second display, or a third display.

12. The apparatus of claim 10, wherein the apparatus directed to cause the home screen with the home screen content to be displayed includes being directed to cause the home screen with the home screen content to be displayed, the home screen content including a user-positioned icon that is selectable for initiating an associated application.

13. The apparatus of claim 10, wherein the apparatus directed to cause the home screen with the home screen content to be displayed includes being directed to cause the home screen with the home screen content to be displayed, the home screen content including a widget that indicates dynamically changing data.

14. The apparatus of claim 10, wherein the apparatus directed to receive the indication of the transition to the multiple display mode includes being directed to receive the indication of the transition to the multiple display mode, the indication being received in response to at least a physical movement of the first display relative to the second display into a position for the multiple display mode.

15. The apparatus of claim 10, wherein the apparatus directed to receive the indication of the transition to the multiple display mode includes being directed to receive the indication of the transition to the multiple display mode, the indication being received in response to at least a physical movement of the first display relative to the second display into a position for the multiple display mode, the physical movement including a sliding of the first display to a position above the second display.

16. The apparatus of claim 10, wherein the apparatus comprises a mobile terminal.

17. The apparatus of claim 16, wherein the apparatus further comprises user interface circuitry and components including the first and second displays, the first and second displays being touch screen displays.

18. A computer program product comprising a memory having program code stored thereon, the program code formulated to direct an apparatus to:
cause application content to be displayed on a first display of a device;

receive an indication of the transition to a multiple display mode;

in response to at least receiving the indication of the transition to the multiple display mode, cause a home screen with home screen content to be displayed by the first display; and in response to at least receiving the indication of the transition to the multiple display mode, cause the application content to transition to being displayed on a second display of the device while the home screen with the home screen content is being displayed by the first display.

19. The computer program product of claim 18, wherein the program code is further formulated to direct the apparatus to, prior to receiving the indication of the transition to the multiple display mode, cause the application content provided by the application being implemented to be displayed by an active display of a single display mode, the active display of the single display mode being one of the first display, the second display, or a third display.

20. The computer program product of claim 18, wherein the program code formulated to direct the apparatus to cause the home screen with the home screen content to be displayed includes being formulated to direct the apparatus to cause the home screen with the home screen content to be displayed, the home screen content including a user-positioned icon that is selectable for initiating an associated application.

21. The computer program product of claim 18, wherein the program code formulated to direct the apparatus to cause the home screen with the home screen content to be displayed includes being formulated to direct the apparatus to cause the home screen with the home screen content to be displayed, the home screen content including a widget that indicates dynamically changing data.

22. The computer program product of claim 18, wherein the program code formulated to direct the apparatus to receive the indication of the transition to the multiple display mode includes being formulated to direct the apparatus to receive the indication of the transition to the multiple display mode, the indication being received in response to at least a physical movement of the first display relative to the second display into a position for the multiple display mode.

* * * * *